United States Patent [19]

Ohta et al.

[11] Patent Number: 5,644,466
[45] Date of Patent: Jul. 1, 1997

[54] POWER FEED CIRCUIT FOR USE IN A SUBMARINE CABLE BRANCHING UNIT

[75] Inventors: Kenji Ohta; Yoshiyuki Inoue, both of Kawasaki, Japan

[73] Assignee: Fujitsu Limited, Kanagawa, Japan

[21] Appl. No.: 373,606

[22] Filed: Jan. 17, 1995

[30] Foreign Application Priority Data

Mar. 17, 1994 [JP] Japan ..................... 6-072632

[51] Int. Cl.⁶ ......................................... H01H 47/22
[52] U.S. Cl. ................................. 361/191; 307/38
[58] Field of Search .................. 307/38, 125, 130, 307/131, 100, 112, 39, 41; 333/100, 101, 105; 361/191, 170, 167, 166; 379/348, 296

[56] References Cited

U.S. PATENT DOCUMENTS 4,798,969  1/1989  Inoue et al. ................. 307/112
5,196,984  3/1993  Webb ........................... 361/191
5,214,312  5/1993  Inoue ........................... 307/43
5,334,879  8/1994  Inoue et al. ................. 361/191 X

FOREIGN PATENT DOCUMENTS

4243330  8/1992  Japan.
4256225  9/1992  Japan.

Primary Examiner—Fritz Fleming
Attorney, Agent, or Firm—Helfgott & Karas, P.C.

[57] ABSTRACT

A submarine cable branching system includes a plurality of directional relays in respective power feed paths branched at a common node, each of the directional relays being energized by a current flowing through the power feed path in a predetermined direction for energizing a corresponding switch provided in a different power feed path to establish a bilateral feed path and further a unilateral feed path, wherein there is provided a bypassing switch across one of the switches that forms the bilateral feed path, such that the bypassing switch is urged to close in response to energization of a self-sustaining relay provided in the unilateral feed path.

12 Claims, 11 Drawing Sheets

POWER FEED CIRCUIT FOR USE IN A SUBMARINE CABLE BRANCHING UNIT

BACKGROUND OF THE INVENTION

The present invention generally relates to optical submarine telecommunication systems and more particularly to a power switching circuit for use in a submarine cable branching unit of a submarine cable system that achieves telecommunication between three or more cable landing stations.

Figure 1A:
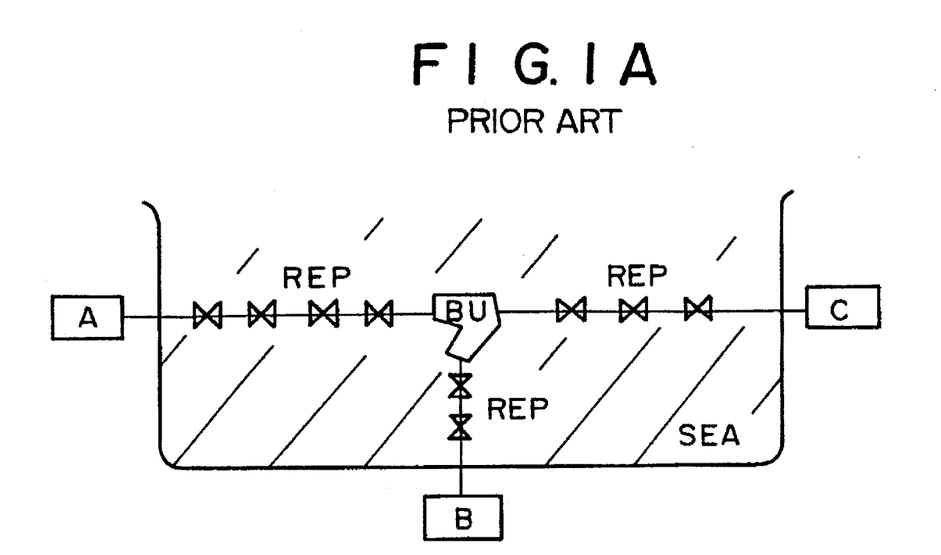
FIGS. 1A–1C are diagrams showing the concept of conventional submarine branching of cables and a power feed system used conventionally in a submarine cable branching unit.

In optical submarine cable systems that achieve telecommunication between three or more cable landing stations, a submarine branching unit is employed for connecting optical cables connected to respective cable landing stations and for feeding electric power to the repeaters in the cables as indicated in FIG. 1A.

Referring to FIG. 1A showing cable landing stations A, B and C connected with each other by respective optical cables at a submarine branching unit BU, it will be noted that each of the optical cables includes a number of repeaters REP fed by a power feed line provided in the optical cable. Thus, the repeaters REP as well as the submarine branching unit BU itself are supplied with electric power from the corresponding cable landing stations by way of feeding path formed by the power line in the optical cables. In FIG. 1A, as well as in FIGS. 1B and 1C, the power line in the optical cable is represented by a continuous line.

Typically, the feeding of the electric power is achieved bilaterally from two cable landing stations via respective optical cables connected at the submarine branching unit BU. Alternatively, the electric power is fed unilaterally from one of the cable landing stations to the submarine branching unit BU that is grounded to the sea floor, along an optical cable that forms a single power feed path.

Figure 1B:
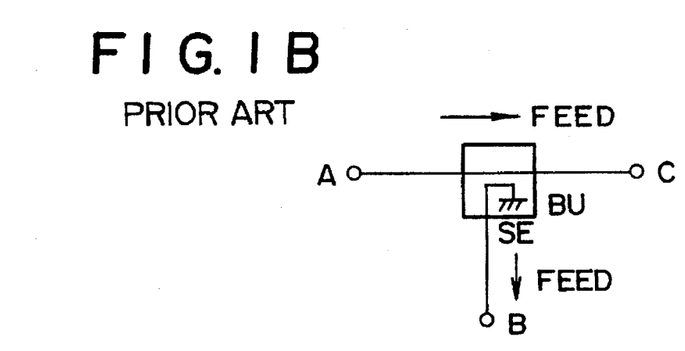

When using a submarine branching unit that merges three communication paths or branches, two of the cable landing stations are used for the bilateral feeding of electric power and the remaining one cable landing station is used for the unilateral feeding as indicated in FIG. 1B. Further, such a submarine branching unit is constructed, as proposed in the Japanese Patent Application 2-182150, to maintain communication between two cable landing stations via two optical cables, even in the event that there occurs a failure in any one of the three optical cables.

Figure 1C:
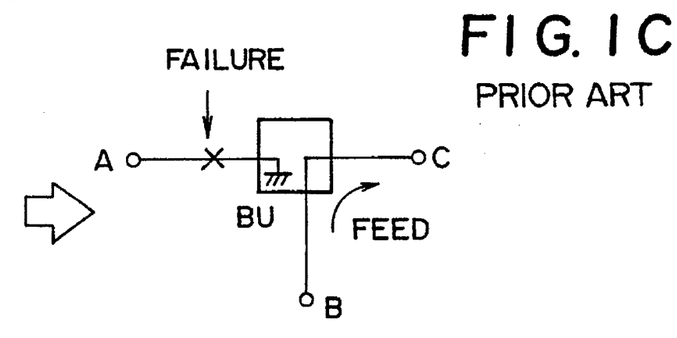

FIG. 1C shows the occurrence of such a failure in the system of FIG. 1B, wherein it will be noted that the submarine branching unit BU is constructed to achieve a bilateral power feeding between the stations A and C and further to achieve a unilateral power feeding from the station B to the ground or sea floor as indicated by SE.

Referring to FIG. 1C showing an example in which a failure has developed in the optical cable from the station A to the submarine branching unit BU, the submarine branching unit BU switches the power feed path such that the feeding of electric power is still maintained by setting a bilateral power feed path between the stations B and C and further setting a unilateral power feed path for the station A. Thereby, the bilateral power feed path between the stations B and C are maintained active, even when the unilateral power feed path from the station A is lost due to the failure in the optical cable from the station A to the submarine branching unit BU.

Figure 2A:
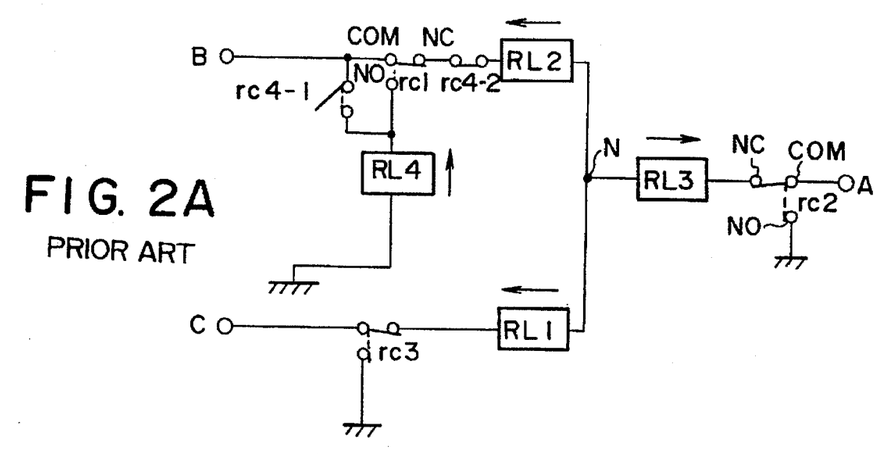
FIGS. 2A and 2B are diagrams showing the construction of a conventional power feed system of a submarine cable branching unit.
Figure 2B:
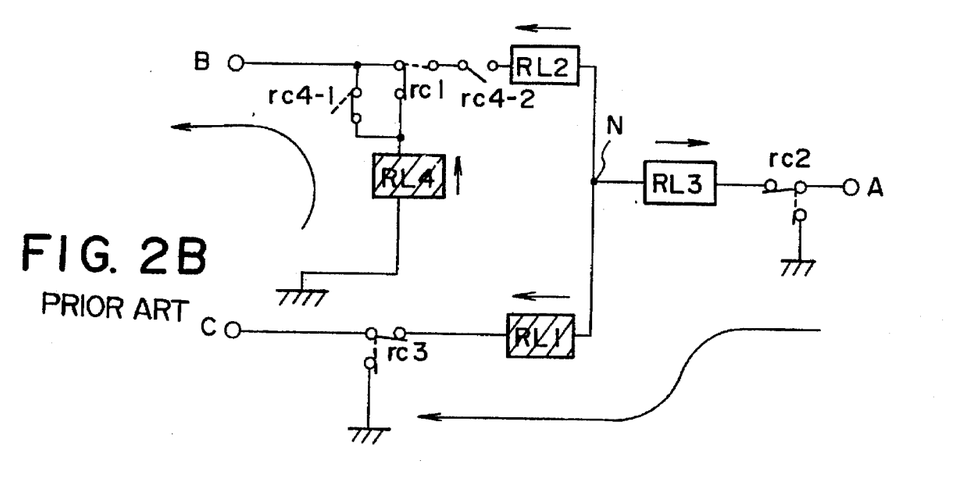

FIGS. 2A and 2B show a conventional power switching circuit used in the submarine branching unit BU, wherein it will be noted that the branching unit BU achieves a three-way branching of the telecommunication paths similarly to the submarine branching unit BU described with reference to FIGS. 1A–1C.

Referring to FIG. 2A, it will be noted that each of the three branches includes a relay that passes a current in a direction from a central node N to the corresponding cable landing station as indicated by arrows. For example, the branch extending from the node N to the station C includes a relay RL1, the branch extending from the node N to the station B includes a relay RL2, and the branch extending from the node N to the station A includes a relay RL3, wherein all of the relays RL1–RL3 are energized only when the current flows through respective branches in the direction indicated by arrows and cooperate with respective switch circuits $rc_1$, $rc_2$ and $rc_3$. Here, it should be noted that the switch circuits are urged to close the respective branches and simultaneously open the respective ground paths in the inactivated or non-energized state of the relays.

For example, the switch circuit $rc_1$ cooperates with the solenoid of the relay RL1 provided in the branch extending from the central node N to the station C, and closes the current path between the node N and the station B, provided that the relay RL1 is not energized. Thereby, the ground path between the station B and the sea floor on which the branching unit BU is opened. Upon energization of the relay RL1, on the other hand, the switch circuit $rc_1$ is urged to open the current path between the node N and the station B, and the foregoing ground path from the station B to the sea floor is closed by the switch circuit $rc_1$. Similarly, the switch circuits $rc_2$ and $rc_3$ cooperate with the solenoids of the relays RL2 and RL3 provided in the branches extending from the central node N to the station B and from the central node N to the station A respectively, and close the respective current paths from the node N to the station A and from the node N to the station C in the non-energized state of the relays RL2 and RL3. Thereby, the switch circuits $rc_2$ and $rc_3$ also open the ground path from the station A or station C to the sea floor. Upon energization of the relays RL2 and RL3, on the other hand, the switch circuits $rc_2$ and $rc_3$ are urged to open the foregoing feed paths between the station A and the node N and between the station C and the node N, and the feed path from the station A as well as the feed path from the station C are grounded via the switch circuits $rc_2$ and $rc_3$ thus actuated. In FIG. 2A, it should be noted that the switches $rc_1$–$rc_3$ are represented in the non-energized state of the respective relays RL1–RL3.

It should be noted that each of the switch circuits includes a normally-open contact NO, a normally-closed contact NC and a common terminal COM, wherein the common terminal COM, being connected to the end of the optical fiber cable extending to the corresponding station, is connected to the normally-closed contact NC in the deactivated state of the relay. In the case of the relay RL1, for example, the common terminal COM of the switch circuit $rc_1$ at the end of the cable from the station B, is connected to the normally-closed contact NC when the relay RL1 is not energized or energized in the direction opposite to the arrow. When energized in the direction of the arrow, on the other hand, the relay RL1 causes the switch circuit $rc_1$ to switch the connection of the common terminal COM from the normally-closed contact NC to the normally-opened contact NO. In FIG. 2A, it should be noted that the continuous lines of the switch circuits $rc_1$–$rc_3$ represent the state in which no energization is applied to the relays RL1–RL3. On the other hand, the broken lines indicate the state in which the relays RL1–RL3 are energized. As already noted, the relays RL1–RL3 are energized only when the drive current flows in the direction of the arrows.

Thus, when a bilateral feed is achieved from the station A to the station C, it will be noted that the relay RL3 in the bilateral current path from the station A to the station C is not energized in view of the opposite direction of the drive current, while the relay RL1 is energized. The relay RL2 is not included in the current path and is not activated either. See the state of FIG. 2B, wherein the hatched box represents the energized state of the relay. Thereby, the switch circuit $rc_1$ is activated to connect the cable from the station B to the ground provided by the sea floor, and there is formed a unilateral feed path in addition to the bilateral feed path. As a result of the energization of the relay RL1 as such, it should be noted that the common terminal COM of the switch circuit $rc_1$ is now contacted to the normally-open contact NO and the cable extending from the station B is connected to the sea floor ground. It should be noted that the switch circuits $rc_2$ and $rc_3$ of the relays RL2 and RL3 sustain the bilateral current path in view of the non-energized state of the relays RL2 and RL3.

When there occurs a failure in the path connecting between the stations A and C in the state of FIG. 2B, on the other hand, the relay RL1, hitherto being energized by the drive current through the bilateral feed path, is now deenergized due to the interruption of the drive current, and the switch circuit $rc_1$ of the relay RL1 inevitably recovers the original state shown in FIG. 2B by a broken line in which the common terminal COM is connected to the normally-closed terminal NC. Thereby, it should be noted that the unilateral feed path between the station B and the sea floor is also disconnected. In other words, the power supply to the branching unit BU is totally interrupted and the branching unit BU is lost from the system.

Thus, in order to maintain the unilateral feed path and to save the branching unit BU, there is provided a self-sustaining relay RL4 in the ground path, with a corresponding switch circuit $rc_4$ such that a normally-open switch circuit $rc_{4-1}$ of the switch circuit $rc_4$ is provided parallel to the normally-open contact of the switch circuit $rc_1$ for bypassing the same and such that a normally-closed switch circuit $rc_{4-2}$ is connected in series to the relay RL2.

In the foregoing construction, it should be noted that the self-sustaining relay RL4 is energized in response to the unilateral feeding of the drive current that flows from the sea floor to the station B, such that the switch circuit $rc_{4-1}$ forms a self-sustaining current path that preserves the unilateral feeding path to the ground even after the relay RL1 has returned to the original, non-energized state. Of course, it is possible to provide a similar self-sustaining ground circuit to other grounded feed paths connected to the station A or C.

Figure 3A:
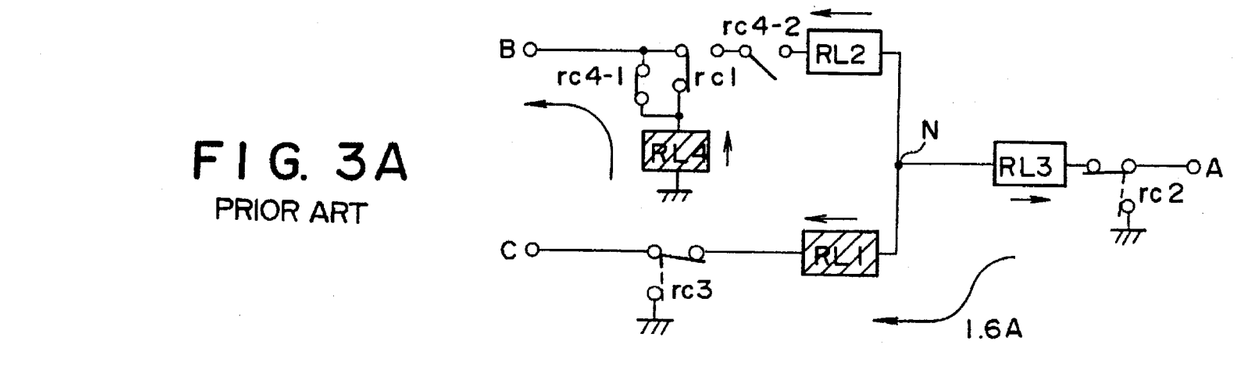
FIGS. 3A–3C are diagrams showing the failure occurred in the conventional power feed system of the submarine cable branching unit.
Figure 3B:
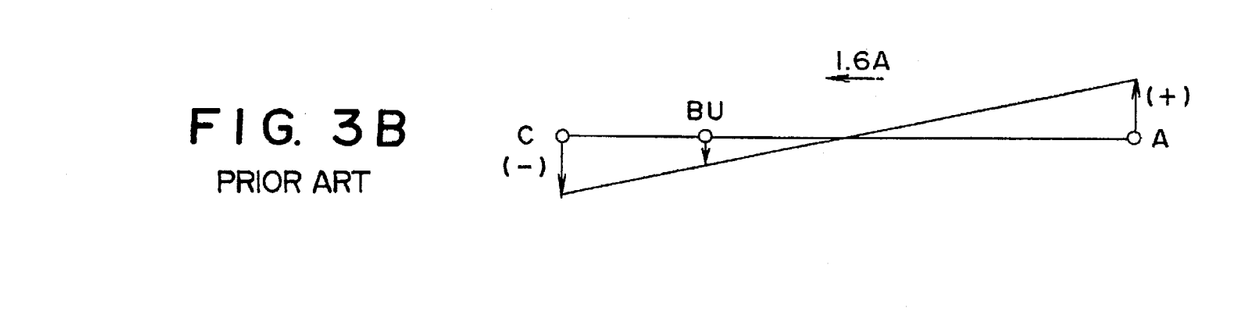
Figure 3C:
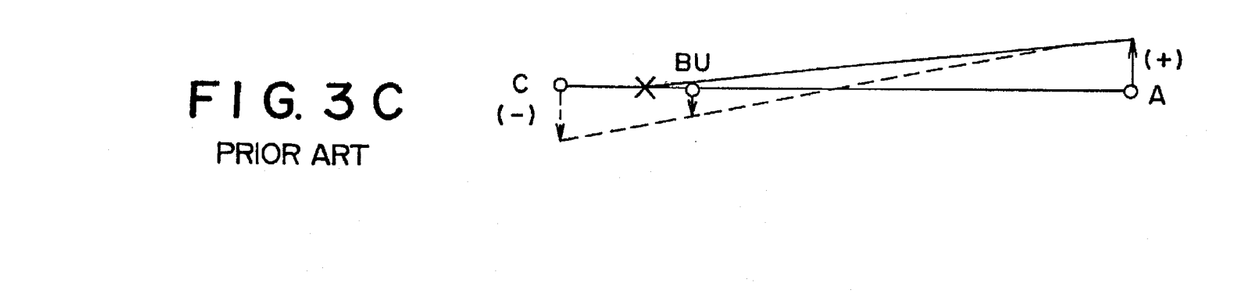

FIGS. 3A–3C show the state of the branching unit BU and the voltage distribution between the stations, wherein FIG. 3A shows the state of the branching unit BU, while FIG. 3B shows the voltage distribution between the stations A and C along the bilateral feed path. Further, FIG. 3C shows the voltage distribution in the event there occurred a failure in the path from the node N to the station C. It should be noted that FIG. 3A corresponds to FIG. 2B and represents a normal state in which a bilateral feeding is achieved between the stations A and C and simultaneously a unilateral feeding is achieved between the station B and the sea floor.

In the normal state of the branching unit BU shown in FIG. 3A, it will be noted that a positive voltage is supplied to the station A and a negative voltage to the station C, and the voltage on the cable changes generally linearly from the station A to the station C as indicated in FIG. 3B.

When a failure has developed between the branching unit BU and the station C as indicated by a cross and the cable is grounded as indicated in FIG. 3C as a result of such a failure, the voltage level of the cable becomes zero at the portion of the cable where the failure has occurred. Thereby, the electric charges accumulated in the cable are released suddenly in the vicinity of the site of failure, and a large current pulse tends to flow in the direction opposite to the direction of the current supplied for feeding power.

Figure 4A:
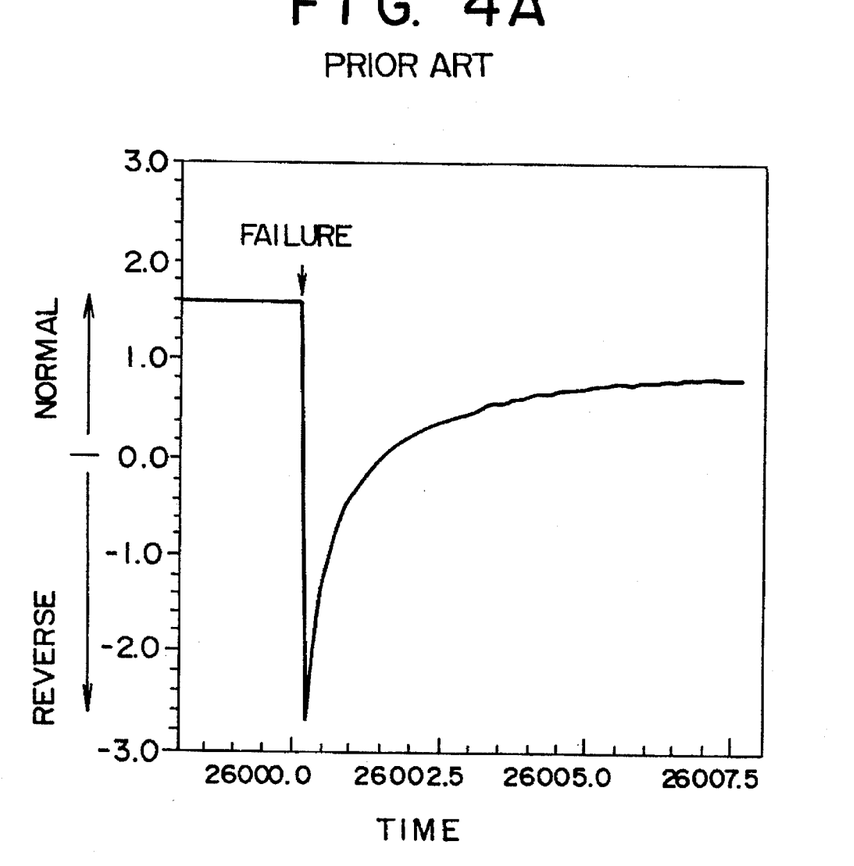
FIGS. 4A–4C are diagrams for explaining the problem occurring in the conventional power feed system.
Figure 4B:
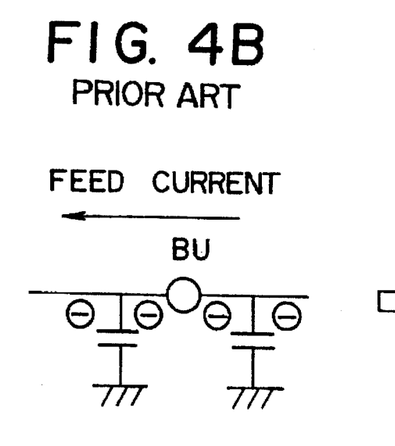
Figure 4C:
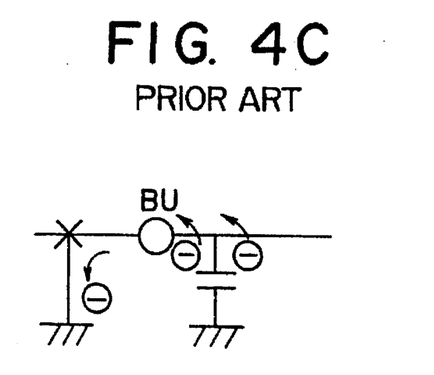

FIG. 4A shows such a flow of the current associated with such a sudden release of the electric charges on the optical cable, wherein the vertical axis of FIG. 4A shows the voltage of the power feed path while the horizontal axis represents the time. Further, FIGS. 4B and 4C show the mechanism of such a current pulse in the form of equivalent circuit diagram. FIG. 4B shows the normal state where no failure has occurred. In this state, the electric charges are accumulated on the insulating shield or other insulating part of the optical cables that acts as a capacitor while the feed current is being supplied as indicated by an arrow in FIG. 4B. When there occurs a short circuit, on the other hand, the electric charges in the capacitor are suddenly discharged as indicated by arrows in FIG. 4C, and there appears a large reverse voltage pulse shown in FIG. 4A in response to such a failure.

Such a large reverse voltage pulse causes a large reverse current to flow through the cable, while the large reverse current in turn causes an unwanted energization of the relay RL3. In the normal state of FIG. 3A, it should be noted that the direction of the current flowing from the station A to the station C has been opposite to the direction of the current that energizes the relay RL3, and the switching of the switch circuit $rc_3$ has not occurred. On the other hand, when there flows a large reverse current through the relay RL3, there is a substantial risk that the relay RL3 is energized and the switch circuit $rc_3$ switches.

It should be noted that such a switching of the switch circuit $rc_3$ causes the grounding of the reverse current, and the energization of the relay RL3 disappears immediately. In response to the disappearance of energization of the relay RL3, the switch circuit $rc_3$ resumes the original state and the cable extending from the station C is connected to the feeding path that includes the relay RL3. Thereby, the relay RL3 is re-energized and the switch circuit $rc_3$ causes switching. Further, such on-off operations of the relay RL3 and hence on-off switching of the switch circuit $rc_3$ are repeated a plurality of times to cause a chattering. As high voltage is applied to the switch circuit $rc_3$, there is a substantial risk that the switch circuit $rc_3$ is seriously damaged as a result of the chattering. It should be noted that the relays RL1–RL3 are typically formed of vacuum relay. In the submarine cable systems where high reliability is absolute requirement, such a chattering is not tolerated and has to be eliminated.

SUMMARY OF THE INVENTION

Accordingly, it is a general object of the present invention to provide a novel and useful submarine cable system wherein the foregoing problems are eliminated.

Another and more specific object of the present invention is to provide a submarine cable system having an improved reliability.

Another object of the present invention is to provide a submarine cable system having a submarine cable branching unit, wherein the problem of unstable operation such as a chattering of a relay used therein, caused as a result of reverse current flowing through the submarine cable upon occurrence of a failure in the cable, is successfully and positively eliminated.

Other objects and further features of the present invention will become apparent from the following detailed description when read in conjunction with the attached drawings.

DETAILED DESCRIPTION OF THE PREFERRED EMBODIMENTS

DETAILED DESCRIPTION OF PREFERRED EMBODIMENTS

Figure 5:
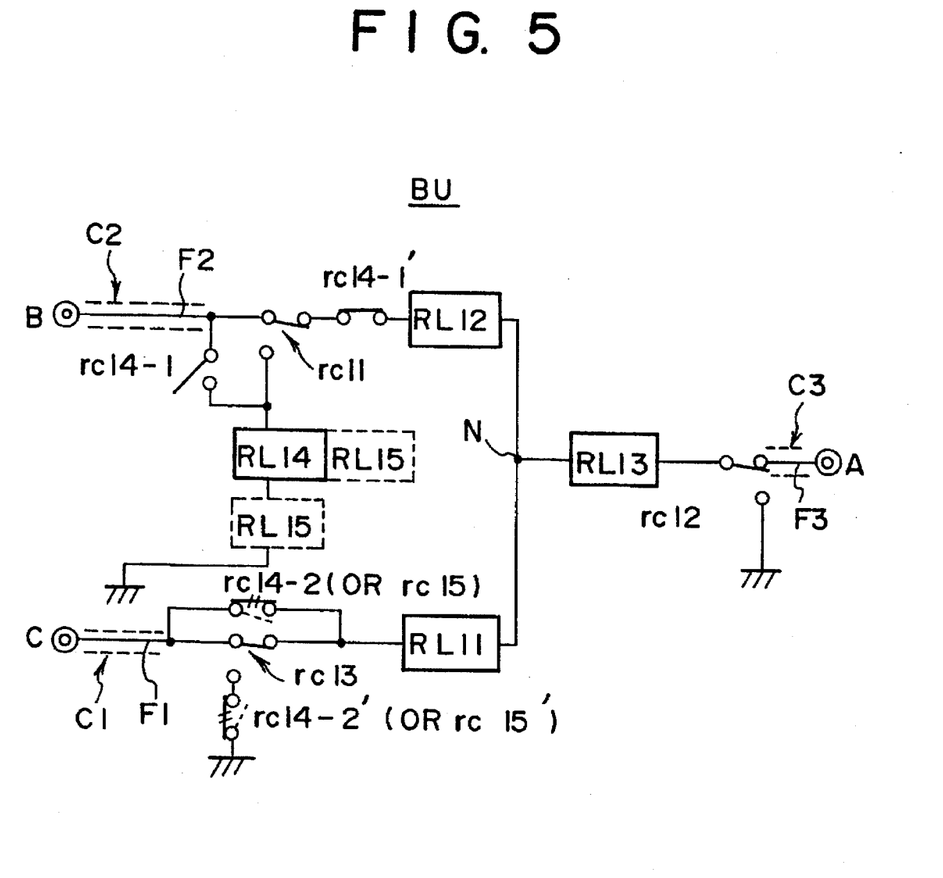
FIG. 5 is a diagram showing a first embodiment of the present invention.

First, the principle of the present invention will be described with reference to FIG. 5 showing a first embodiment of the power feed system of the present invention.

Referring to FIG. 5, the submarine cable system includes a submarine cable branching unit BU adapted for use in a submerged environment, and there is provided a first cable C1 having a first end connected to the branching unit BU and a second, opposite end adapted for connection to a first cable landing station C, wherein the first cable C1 includes a first feed branch F1 for feeding electric power from the first cable landing station C to the submarine cable branching unit BU. Further, there is provided a second cable C2 having a first end connected to the submarine cable branching unit BU and a second, opposite end adapted for connection to a second cable landing station B, wherein the second cable C2 includes a second feed branch F2 for feeding electric power from the second cable landing station B to the submarine cable branching unit BU. Similarly, there is provided a third cable C3 having a first end connected to the submarine cable branching unit BU and a second, opposite end adapted for connection to a third cable landing station A, wherein the third cable C3 includes a third feed branch F3 for feeding electric power from the third cable landing station A to the submarine cable branching unit BU. It should be noted that the first through third feed branches F1–F3 are connected with each other at a common node N in the submarine cable branching unit BU.

Further, the system of FIG. 5 includes a first relay RL11 provided in the first feed branch F1 so as to be activated in response to a current flowing through the first feed branch F1 only in one of a first direction heading toward the submarine cable branching unit BU and a second direction away from the submarine cable branching unit BU. Further, there is provided a second relay RL12 in the second feed branch F2 so as to be activated in response to a current flowing through the second feed branch F2 only in a direction toward the submarine cable branching unit BU, provided that the first relay RL11 is set to be activated by the current that flows in the first direction. When the first relay RL11 is set to be activated by the current that flows in the second, opposite direction, on the other hand, the second relay RL12 is set to be activated in response to a current flowing in a direction away from the submarine cable branching unit BU.

Further, there is provided a third relay RL13 in the third feed branch, wherein the third relay is set to be activated in response to a current flowing through the third feed branch only in a direction toward the submarine cable branching unit MU when the first relay RL11 is set to be activated by the current that flows in the first direction. When the first relay RL11 is set to be activated by the current flowing in the second, opposite direction, on the other hand, the third relay RL13 is set to be activated only in response to a current flowing through the third feed branch in a direction away from the submarine cable branching unit BU.

It should be noted that the second feed branch F2 includes a first normally closed switch circuit $rc_{11}$ that is opened by the first relay RL11, wherein the switch circuit $rc_{11}$ opens a ground path of the second feed branch F2 in a normally closed state thereof. In an actuated state, on the other hand, the switch circuit $rc_{11}$ closes the ground path of the second feed branch F2. Further, the third feed branch F3 includes a second normally closed switch circuit $r_{12}$ that is opened by the second relay RL12, wherein the second normally closed switch circuit $r_{12}$ opens a ground path of the third feed branch F3 in a normally closed state thereof. Similarly, the first feed branch F3 includes a third normally closed switch circuit $r_{13}$ that is opened by the third relay RL13, wherein the third normally closed switch circuit $r_{13}$ opens a ground path of the first feed branch F1 in a normally closed state thereof.

In the system of FIG. 5, it should be noted that the ground path of the second feed branch F2 includes a fourth relay RL14 having a first normally open switch circuit $rc_{14-1}$ connected in series to the fourth relay RL14, such that the fourth relay RL14 urges, when energized, the normally open switch circuit $rc_{14-1}$ to close. The first feed branch further includes a second normally open switch circuit $rc_{14-2}$ so as to bypass the third normally closed switch circuit $rc_{13}$ therein, wherein the second normally open switch circuit is closed in response to energization of the fourth relay RL14.

In a normal operation mode, there is formed a bilateral power feed path between the stations A and C, such that an electric current is fed from the station A to the station C via the third and first feed branches F3 and F1. Further, there is established a unilateral path in which the electric current is supplied from the ground to the station B via the second feed branch F2. Further, it is assumed that all of the relays RL11–RL13 are energized only when a current flows therethrough in a direction away from the central node N.

Thus, in this normal operational mode, the relay RL13 in the feed branch F3 is not energized and the switch circuit $rc_{13}$ is set to close the feed branch F1. Thereby, the electric current flows freely from the station A to the station C, and the repeaters on the first and third branches are fed with electric power. Further, it should be noted that the current on the first feed branch F1 energizes the relay R11. Thereby, the switch circuit $rc_{11}$ is switched to open the second feed branch F2 and to close the ground path of the second feed branch F2. Associated with this, the relay R12 is left unenergized, and the corresponding switch circuit $rc_{12}$ closes the third feed branch F3.

In this state, the fourth relay RL14 is energized via the ground path closed by the switch circuit $rc_{11}$, while the energization of the relay RL14 causes the corresponding switch circuit $rc_{14-1}$ to close. Thereby, the current flows from the ground to the station B along the unilateral feed path formed by the feed branch F2, and the current on the unilateral feed path urges the switch circuit $rc_{14-1}$ to maintain the closed state. Further, there is provided a normally closed switch circuit $rc_{14-1}'$ in the feed branch F2 in series to the relay RL12, wherein the switch circuit $rc_{14-1}'$ is activated in response to the relay RL14 such that the switch circuit $rc_{14-1}'$ is closed in the non-energized state of the relay RL14 and opened in the energized state of the relay RL14.

When there occurs a failure in the bilateral feed path in this state, the energization of the relay RL11 disappears and the switch circuit $rc_{11}$ returns to the original state that opens the ground path of the feed branch F2. On the other hand, the energization of the relay RL14 is maintained by the self-sustaining switch circuit $rc_{14-1}$, and the unilateral feed path through the second feed branch F2 is maintained, even when such a failure has occurred. Further, the switch circuit $rc_{14-1}'$ is held open in response to the energization of the relay RL14. Thereby, the feeding of electric power along the unilateral feed path is maintained even when such a failure has occurred in the bilateral feed path.

It should be noted that the system of FIG. 5 includes the normally open switch circuit $rc_{14-2'}$, wherein the switch circuit $rc_{14-2}$ is closed as long as the unilateral feed path is active and the relay RL14 is energized. Thus, even when a reverse current flows through the switch circuit $rc_{13}$ and hence through the relay RL13 as a result of failure in the feed branch F3, such a reverse current is canceled by feed current continuously supplied from the station A via the switch circuit $rc_{14-2'}$, and the chattering of the switch circuit $rc_{13}$ caused by such a reverse current is effectively eliminated. In the construction of FIG. 5, one may provide a normally open switch circuit $rc_{14-2}'$ in the ground path of the feed branch F1 such that the switch circuit $rc_{14-2}'$ is closed in response to the energization of the relay RL14.

Further, it should be noted that one may provide another relay RL15 in the ground path of the feed branch F2 either in series or parallel to the relay RL14 and provide a corresponding normally open switch circuit $rc_{15}$ in place of the switch circuit $rc_{14-2}$ such that the switch circuit $rc_{15}$ is closed upon energization of the relay RL15. Furthermore, one may provide a normally closed switch circuit $rc_{15}'$ in the ground path of the first feed branch F1 in place of the switch circuit $rc_{14-2}'$ such that the switch circuit $rc_{15}'$ is closed by the relay RL15 upon energization thereof.

Figures 6A, 6C:
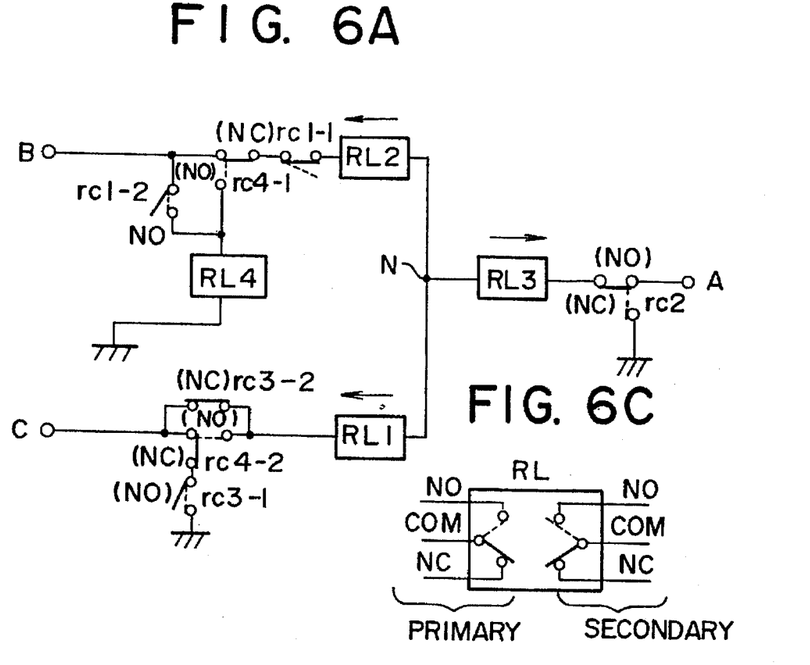
FIGS. 6A–6C are diagrams showing a submarine cable system according to a second embodiment of the present invention.
Figure 6B:
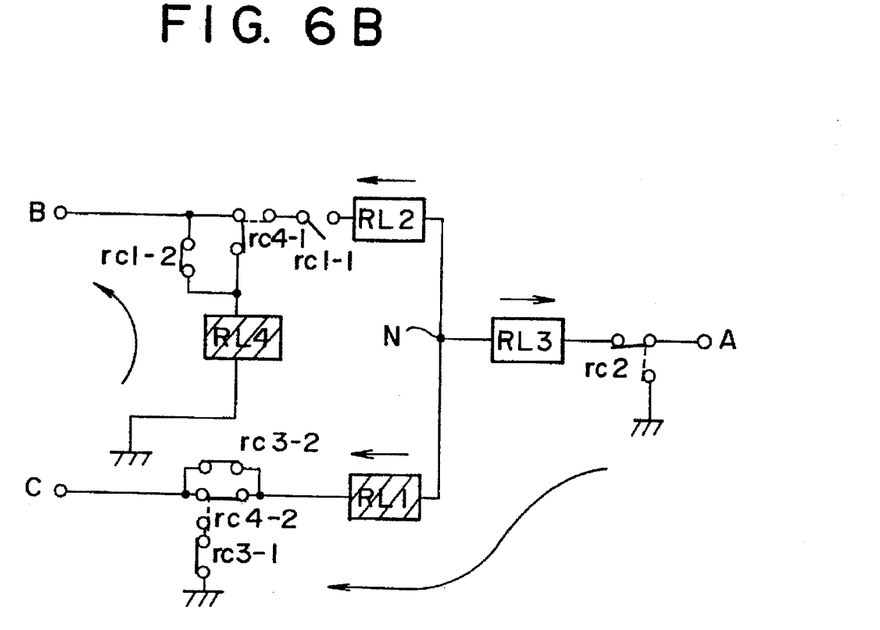

FIGS. 6A and 6B show a second embodiment of the present invention, wherein those parts described already with reference to preceding drawings are designated by the same reference numerals and the description thereof will be omitted. Further, FIG. 6C shows the construction of the relays used in the system of FIGS. 6A and 6B. It should be noted that FIG. 6A shows the state where there is no feeding of power, while FIG. 6B shows the state in which a normal bilateral feeding as well as a normal unilateral feeding of power are achieved. In FIG. 6B, the hatched box indicates the relays that are in the energized state.

First, the construction of the relays RL1–RL3 used in the present embodiment as well as in the previous embodiment will be described with reference to FIG. 6C.

Referring to FIG. 6C, it will be noted that the relay RL has a primary side switch circuit and a secondary side switch circuit, wherein each circuit includes a common terminal COM, a normally open contact NO, and a normally closed contact NC. One of the normally open contact NO and the normally closed contact NC is selectively connected to the common terminal COM in response to the energization of a solenoid of the relay cooperating to the switch circuit as usual.

In the present embodiment shown in FIG. 6A, the switch circuit $rc_{4-1}$, hitherto provided parallel to the switch circuit $rc_1$ in the conventional construction of FIG. 2A, is now provided to replace the switch circuit $rc_1$. More specifically, the feed path from the station B is connected to the common terminal COM of the switch circuit $rc_{4-1}$ and an end of the ground path that extends to the relay RL4 is connected to the normally open contact NO of the same switch circuit $rc_{4-1}$. Further, the normally closed contact NC of the switch circuit $rc_{4-1}$ is connected to a line extending to the relay RL2. In addition, it should be noted that the common terminal COM of a switch circuit $rc_{1-1}$ that cooperates with the relay RL1, is connected to the normally closed contact NC of the switch circuit $rc_{4-1}$, while the normally closed contact NC of the same switch circuit $rc_{1-1}$ is connected to the relay RL2. Thus, when the relay RL1 is energized, the switch circuit $rc_{1-1}$ is opened and the relay RL2 is disconnected from the feed path from the station B, while in the unenergized state of the relay RL1, the switch circuit $rc_{1-1}$ is closed and the relay RL2 is connected to the feed path from the station B. In addition, a secondary side switch circuit $rc_{1-2}$, which forms a secondary side circuit of the switch circuit $rc_1$ and cooperates with the relay RL1, is provided between the power feed path from the station B and the relay RL4, such that the normally open contact NO of the switch circuit $rc_{1-2}$ is connected to the relay RL4 and the common terminal COM connected to the power feed path from the station B.

Further, the secondary side circuit $rc_{4-2}$ of the switch circuit $rc_4$ that cooperates with the relay RL4, is provided in place of the switch circuit $rc_3$ of the conventional construction of FIGS. 2A and 2B, such that the switch circuit $rc_{4-2}$ opens the power feed path from the station C to the relay RL1 in the unenergized state of the relay RL4. Thereby, it should be noted that the normally closed contact NC of the circuit $rc_{4-2}$ is grounded to the sea floor in the unenergized state of the relay RL4, and the normally open contact NO of the switch circuit $rc_{4-2}$ is connected to the relay RL1.

In addition, it should be noted that the secondary side circuit $rc_{3-2}$ of the switch circuit $rc_3$, which cooperates with the relay RL3, is provided parallel to the switch circuit $rc_{4-2}$. Thereby, the switch circuit $rc_{4-2}$ bypasses the switch circuit $rc_{3-2}$ in the normally closed state of the circuit $rc_{4-2}$.

In operation, there is formed a bilateral feed path between the station A and the station C. In addition, there is formed a unilateral feed path from the station B to the sea floor ground through the relay RL4. Thereby, the relay RL1 is energized in response to the current flowing from the station A to the station C as indicated by hatching in FIG. 6B and the switch circuit $rc_{1-2}$ is closed to establish the foregoing unilateral feed path. On the other hand, the switch circuit $rc_{1-1}$ is opened. In FIG. 6B, the hatching for the relays RL1 and RL4 indicates that the relays are energized. In response to the formation of the unilateral feed path, the relay RL4 is energized to close switch $rc_{4-1}$. In other words, the energization of the relay RL4 is self-sustained. Thus, the unilateral feed path is maintained even when there occurs a failure in the bilateral feed path between the stations A and C. As already noted, the relay RL3 is not energized by the current flowing therethrough in the direction from the station A to the station C.

When the self-sustaining relay RL4 is energized, on the other hand, the secondary side switch circuit $rc_{4-2}$ is also switched to close the path between the station C and the relay RL1, and the switch circuit $rc_{4-2}$ thereby forms a bypass of the switch circuit $rc_{3-2}$ in the bilateral feed path extending between the stations A and C.

When there occurs a ground failure in the cable extending to the station C in such a state, a reverse current may flow in the direction from the station C to the station A as a result of the static discharge. Such a reverse current may energize the relay RL3 and there occurs a switching of the circuit $rc_{3-2}$ such that the circuit $rc_{3-2}$ opens. Even in such a case, it should be noted that the switch circuit $rc_{4-2}$ of the relay RL4 is held in a closed state due to the energization of the relay RL4 in the unilateral feed path. Thereby, the reverse current pulse is canceled by the feed current continuously supplied from the station A via the bypassing switch circuit $rc_{4-2}$, and the problem of the interruption of the bilateral feed path does not occur in the present invention, and the chattering of the switch circuit $rc_{3-2}$ is eliminated. The bypassing circuit formed by the switch circuit $rc_{4-2}$ can be easily eliminated by interrupting the energization to the relay RL4 in the unilateral feed path.

Next, a third embodiment of the present invention will be described with reference to FIGS. 7A and 7B, wherein those parts described previously are designated by the same reference numerals and the description thereof will be omitted.

In the present embodiment, the switch circuit $rc_4$ of the relay RL4 includes four switch circuits $rc_{4-1}$–$rc_{4-4}$, such that the switch circuits $rc_{4-1}$–$rc_{4-4}$ are actuated simultaneously in response to the energization of the relay RL4. It should be noted that the switch circuit $rc_{4-1}$ is a normally opened circuit, the switch circuit $rc_{4-2}$ is a normally closed circuit, the switch circuit $rc_{4-3}$ is a normally opened circuit, and the switch circuit $rc_{4-4}$ is a normally closed circuit. In the construction of FIG. 7A, it will be noted that the relays RL1–RL3 as well as the corresponding switch circuits $rc_1$–$rc_3$ are disposed similarly to the conventional construction of FIG. 2A. On the other hand, the present embodiment is distinguished over the conventional construction in that the switch circuit $rc_{4-3}$ bypasses the switch circuit $rc_3$ and that the normally closed switch circuit $rc_{4-4}$ is provided in the ground path extending from the switch circuit $rc_3$.

Figure 7A:
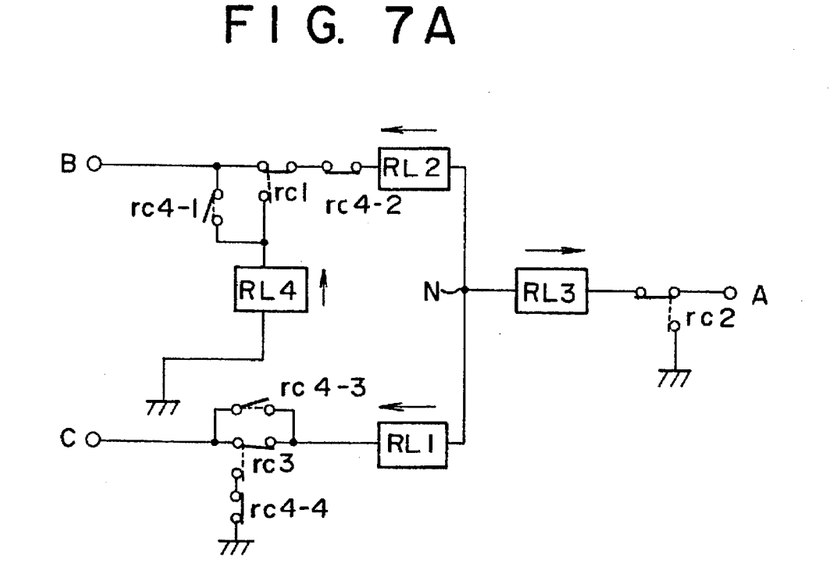
FIGS. 7A and 7B are diagrams showing a submarine cable system according to a third embodiment of the present invention.
Figure 7B:
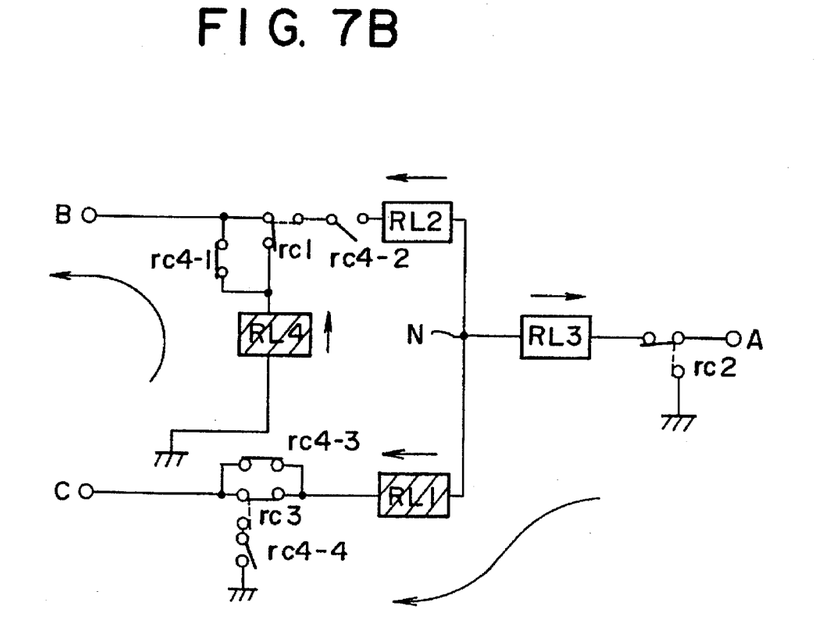

FIG. 7B shows the normal operational state of the system of FIG. 7A, wherein the hatching for the relays RL1 and RL4 indicates the energized state thereof. Thus, there is formed a bilateral feed path between the stations A and C, and a unilateral feed path is formed also to extend from the station B to the sea floor ground through the relay RL4. When there occurs a failure in the bilateral feed path and a reverse current flows through the relay RL3, the switch $rc_3$ will be opened in response to the energization of the relay RL3. Even in such a case, the bilateral feed path between the stations A and C is maintained by the switch circuit $rc_{4-3}$ that is energized by the relay RL4 in the unilateral feed path. Thereby, the problem of chattering of the relay $rc_3$ is successfully eliminated.

Figure 8A:
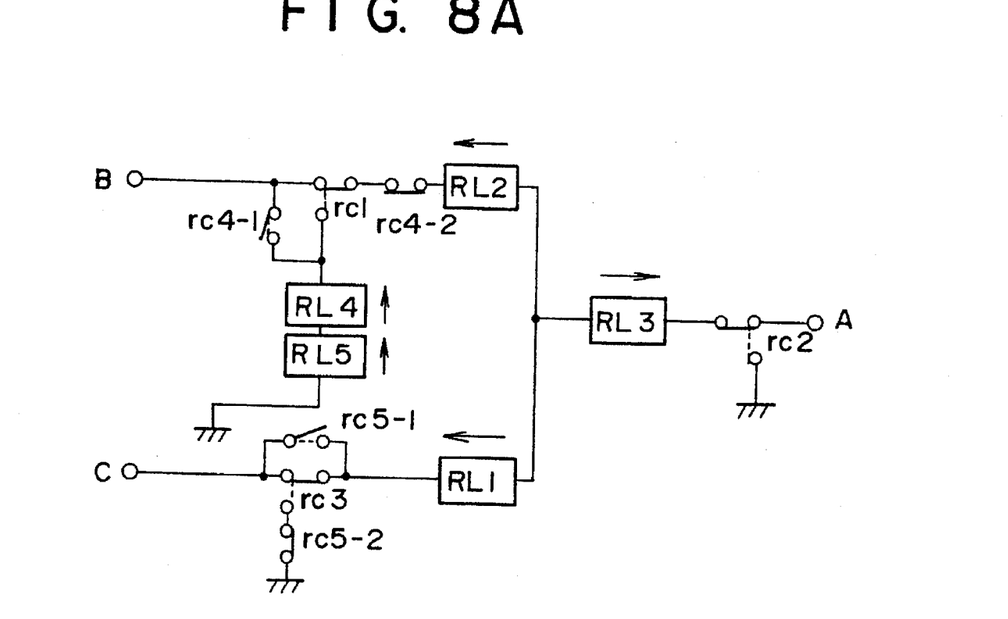
FIGS. 8A and 8B are diagrams showing a submarine cable system according to a fourth embodiment of the present invention.
Figure 8B:
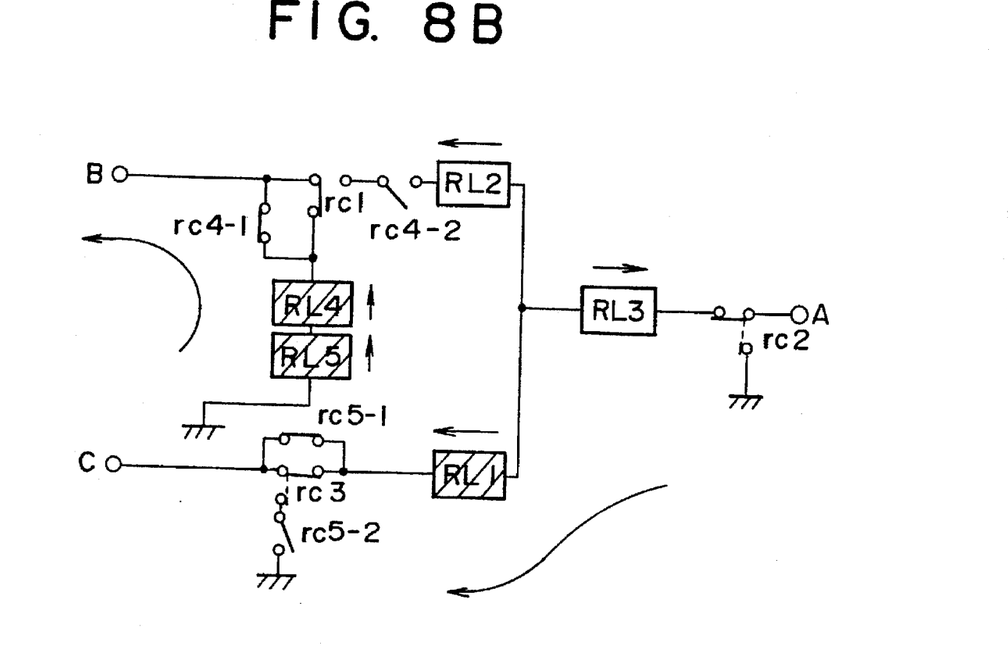

FIGS. 8A and 8B show a fourth embodiment of the present invention, wherein those parts described previously with reference to preceding drawings are designated by the same reference numerals and the description thereof will be omitted. It should be noted that FIGS. 8A shows the state where no feeding of power is made, while FIG. 8B shows the state where a normal bilateral feeding as well as a normal unilateral feeding of power are achieved. In FIG. 8B, the hatched box indicates the relay that is in the energized state.

In the present embodiment, another relay RL5 is connected in series to the relay RL4, and a normally open switch circuit $rc_{5-1}$ cooperating with the relay RL5 is provided to bypass the switch circuit $rc_3$. In addition, there is provided a normally closed switch $rc_{5-2}$ in the ground path extending from the common terminal of the switch $rc_3$. Thus, as long as the unilateral feed path through the relay RL4 and hence through the relay RL5 is active, the switch $rc_{5-1}$ is held closed and the chattering of the relay $rc_3$ does not occur even when there occurs a failure in the bilateral feed path between the stations A and C and a reverse current flows through the relay RL3 in the direction from the station C to the station A to energize the same.

Figure 9A:
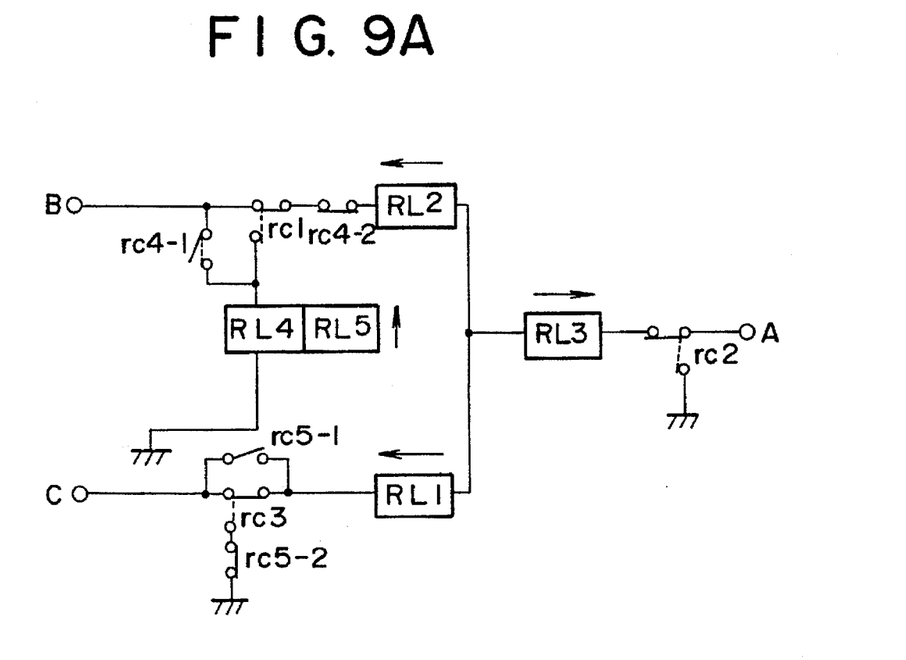
FIGS. 9A and 9B are diagrams showing a submarine cable system according to a fifth embodiment of the present invention.
Figure 9B:
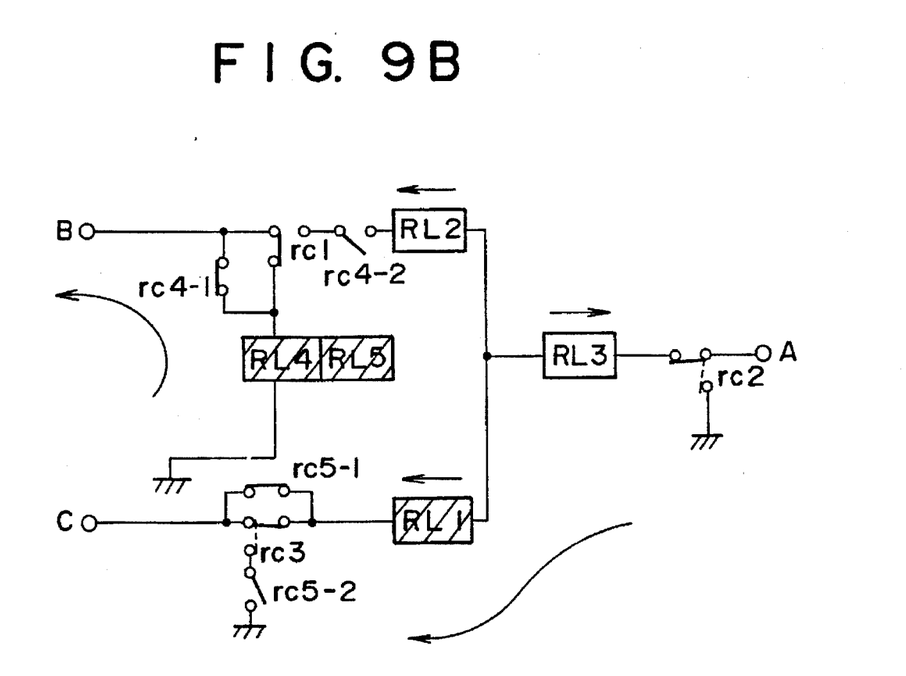

FIGS. 9A and 9B are diagrams showing a fifth embodiment of the present invention, wherein those parts described previously are designated by the same reference numerals and the description thereof will be omitted. Similarly, as before, FIG. 9A shows the state in which no feeding of electric power is made, while FIG. 9B shows the state wherein a bilateral feeding is achieved between the stations A and C and a unilateral feeding is achieved from the station B to the sea floor.

In the present embodiment, the relay RL5 is provided parallel to relay RL4 in the unilateral feed path. Thereby, the relay RL5 is energized similarly to the relay RL4. As the rest of the construction as well as the operation of the present embodiment are substantially the same to those of the previous embodiment, further description will be omitted.

It should be noted that the construction of the embodiment of FIGS. 9A and 9B provides an advantageous feature of reduced power consumption as compared to the case in which the relays RL4 and RL5 are connected in series.

Figure 10A:
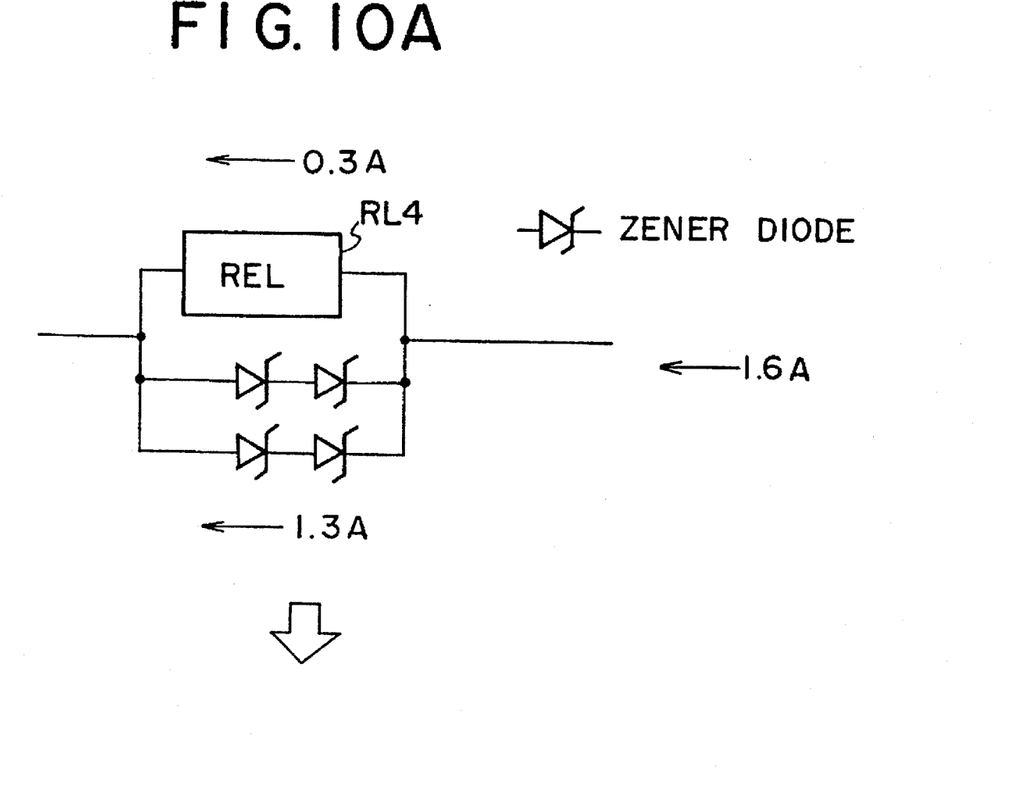
FIGS. 10A and 10B are diagrams showing the construction of relays used in the present invention.

FIG. 10A shows the construction of the relay RL4. It will be noted that the relay RL4 includes Zener diodes connected parallel to the relay RL4 for providing directivity thereto. When a total feed current of 1.6 amperes is supplied to such a construction, for example, a part of the current flows through the relay RL4 with a magnitude of 0.3 amperes, while the rest of the current flows through the Zener diode with a magnitude of 1.3 amperes.

Figure 10B:
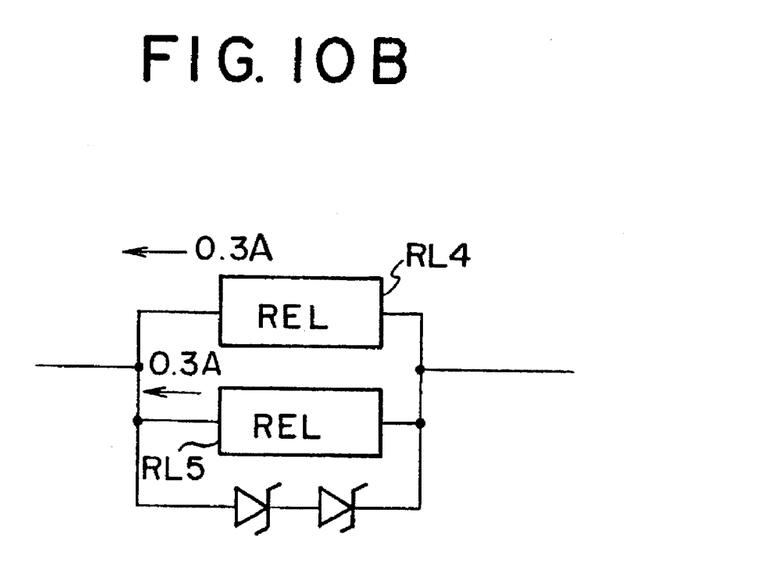

When the relay RL5 is connected parallel to the relay RL4 as indicated in FIG. 10B, on the other hand, the relay RL5 carries a current having a magnitude of 0.3 amperes, wherein the current through the relay RL5 has been bypassed through the Zener diode in the construction of FIG. 10A. Thus, one can activate the relay RL5 for eliminating the chattering, without inviting increase of power consumption, by merely connecting the relay RL5 parallel to the relay RL4.

Figure 11A:
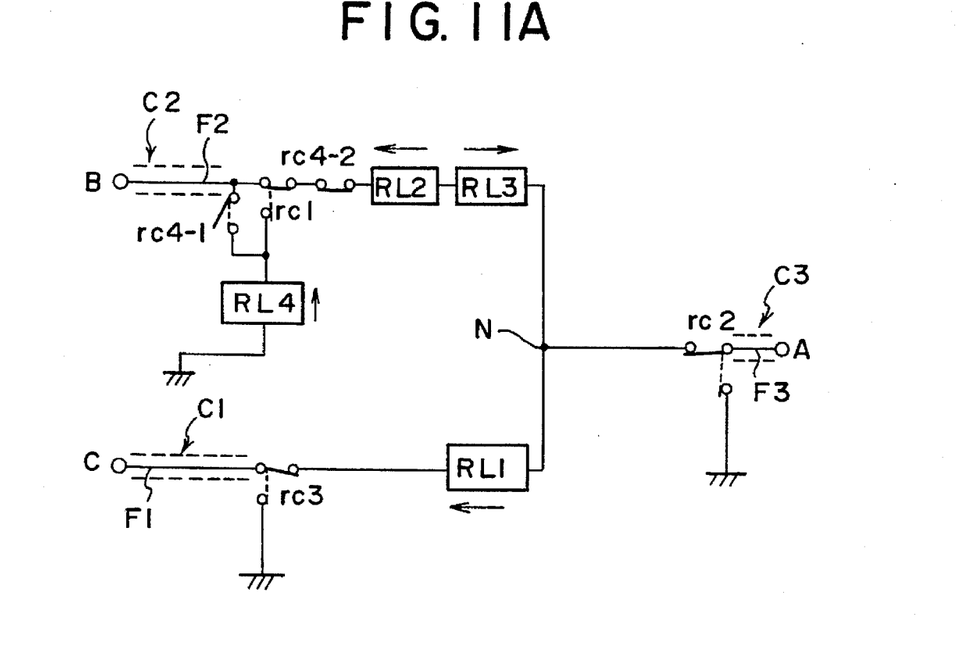
FIGS. 11A and 11B are diagrams showing a submarine cable system according to a sixth embodiment of the present invention.
Figure 11B:
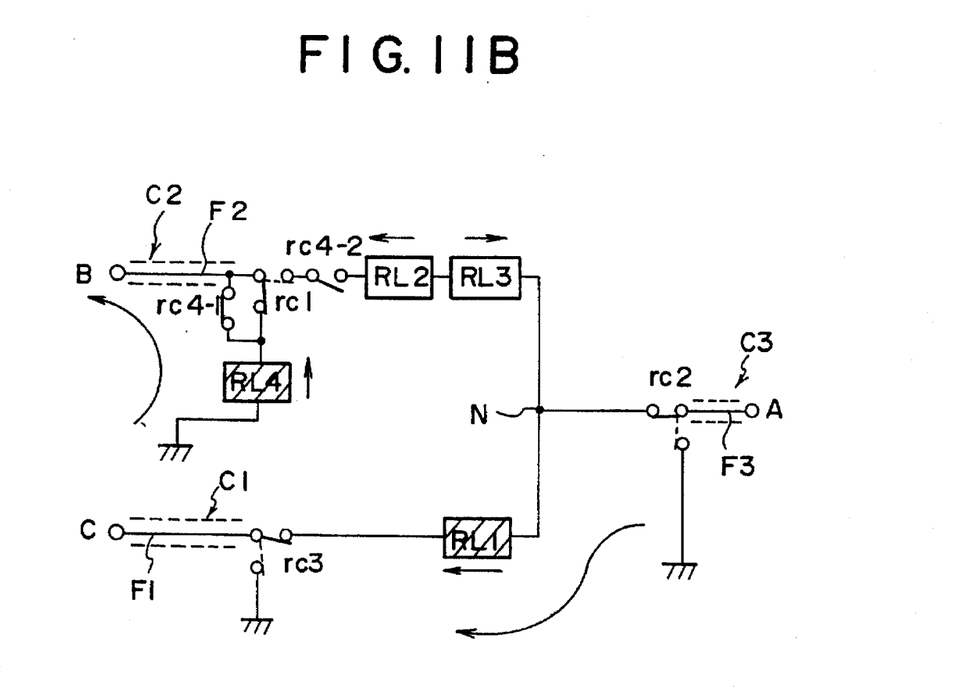

Next, a sixth embodiment of the present invention will be described with reference to FIGS. 11A and 7B, wherein those parts described previously with reference to preceding drawings are designated by the same reference numerals and the description thereof will be omitted. It should be noted that FIG. 11A shows the state where no feeding of power is made, while FIG. 11B shows a state wherein a bilateral feeding of power is achieved between the stations A and C and a unilateral feeding of power is achieved between the station B and the sea floor. In FIG. 11B, the hatched box indicates the relay in the energized state.

Referring to FIG. 11A, the submarine cable system eliminates the chattering of the relay RL3 by removing the relay RL3 from the feed path F3 and inserting the same to the feed path F2 in series to the relay RL2. Similarly as before, the arrows in FIG. 11A indicates the directivity of the relays RL1–RL3. Further, the bypass switch circuit $rc_{4-2}$ or $rc_{5-1}$ used in the previous embodiments for eliminating the chattering of the switch circuit $rc_3$, is eliminated.

In operation, there is formed a bilateral feed path between the stations A and C as indicated in FIG. 11B, and a unilateral feed path is formed between the station B and the sea floor, wherein it will be noted that only the relay RL1 is energized by the current flowing through the bilateral feed path for setting the bilateral feed path. Further, the relay RL4 is energized to sustain the unilateral feed path. In the construction of the present embodiment, it is possible to set a bilateral feed path between the stations B and A and to set a unilateral feed path for the station C. In such a case, the relay RL3 is energized and the switch circuit $rc_3$ connects the feed path from the station C to the ground.

In the present embodiment, it should be noted that the reverse current does not flow through the relay RL3 even when there occurs a ground failure in the bilateral feed path. It should be noted that the relay RL3 is no longer provided in the bilateral feed path between the stations A and C. Thereby, the chattering the relay $rc_3$ does not occur inherently.

Further, various modifications are possible in the present invention. For example, the self-sustaining relay RL4 may be provided in any of the three ground paths, and the relay RL5 provided in corresponding feed paths for bypassing the switch circuit of which chattering is to be eliminated.

Further, the present invention is not limited to the embodiments described heretofore, but various variations and modifications may be made without departing from the scope of the invention.

What is claimed is:

1. A submarine cable system for connecting a plurality of land stations by submarine cables, comprising:

a submarine cable branching unit adapted for use in a submerged environment;

a first cable having a first end connected to said submarine cable branching unit and a second, opposite end adapted for connection to a first land station, said first cable including a first feed branch for feeding electric power from said first land station to said submarine cable branching unit;

a second cable having a first end connected to said submarine cable branching unit and a second, opposite end adapted for connection to a second land station, said second cable including a second feed branch for feeding electric power from said second land station to said submarine cable branching unit;

a third cable having a first end connected to said submarine cable branching unit and a second, opposite end adapted for connection to a third land station, said third cable including a third feed branch for feeding electric power from said third land station to said submarine cable branching unit;

said first through third feed branches being connected with each other at a common node in said submarine cable branching unit;

a first relay provided in said first feed branch, said first relay being activated in response to a first current flowing through said first feed branch only in one of a first direction toward said submarine cable branching unit and a second direction away from said submarine cable branching unit;

a second relay provided in said second feed branch, said second relay being set to be activated in response to a second current flowing through said second feed branch only in a direction toward said submarine cable branching unit when said first relay is set to be activated by said first current that flows in said first direction of said first current, said second relay being set to be activated in response to a second current flowing through said second feed branch only in a direction away from said submarine cable branching unit when said first relay is set to be activated by said first current flowing in said second direction of said first current;

a third relay provided in said third feed branch, said third relay being set to be activated in response to a third current flowing through said third feed branch only in a direction toward said submarine cable branching unit when said first relay is set to be activated by said first current that flows in said first direction of said first current, said third relay being set to be activated in response to a third current flowing through said third feed branch only in a direction away from said submarine cable branching unit when said first relay is set to be activated by said first current flowing in said second direction of said first current;

said second feed branch including a first normally closed switch that is opened by said first relay, said first normally closed switch opening a ground path of said second feed branch in a normally closed state thereof;

said third feed branch including a second normally closed switch that is opened by said second relay, said second normally closed switch opening a ground path of said third feed branch in a normally closed state thereof;

said first feed branch including a third normally closed switch that is opened by said third relay, said third normally closed switch opening a ground path of said first feed branch in a normally closed state thereof;

said ground path of said second feed branch including a fourth relay and a self-sustaining switch connected in series to said fourth relay, such that said fourth relay urges, when energized, said self-sustaining switch to close;

said first feed branch further including a bypassing switch so as to bypass said third normally closed switch therein, said bypassing switch being closed in response to energization of said fourth relay.

2. A submarine cable system as claimed in claim 1, wherein said bypassing switch is a normally opened switch that closes to form a bypass of said third normally closed switch upon energization of said fourth relay.

3. A submarine cable system as claimed in claim 1, wherein said ground path of said second feed branch further includes a fifth relay such that said fifth relay is energized simultaneously to said fourth relay; and wherein said bypassing switch is urged to form a bypass of said third normally closed switch in response to energization of said fifth relay.

4. A submarine cable system as claimed in claim 3, wherein said fifth relay is provided in series to said fourth relay.

5. A submarine cable system as claimed in claim 3, wherein said fifth relay is provided in parallel to said fourth relay.

6. A submarine cable system for connecting a plurality of land stations by submarine cables, comprising:

a submarine cable branching unit adapted for use in a submerged environment;

a first cable having a first end connected to said submarine cable branching unit and a second, opposite end adapted for connection to a first land station, said first cable including a first feed branch for feeding electric power from said first land station to said submarine cable branching unit;

a second cable having a first end connected to said submarine cable branching unit and a second, opposite end adapted for connection to a second land station, said second cable including a second feed branch for feeding electric power from said second land station to said submarine cable branching unit;

a third cable having a first end connected to said submarine cable branching unit and a second, opposite end adapted for connection to a third land station, said third cable including a third feed branch for feeding electric power from said third land station to said submarine cable branching unit;

said first through third feed branches being connected with each other at a common node in said submarine cable branching unit;

a first relay provided in said first feed branch, said first relay being activated in response to a first current flowing through said first feed branch only in one of a first direction toward said submarine cable branching unit and a second direction away from said submarine cable branching unit;

a second relay provided in said second feed branch, said second relay being set to be activated in response to a second current flowing through said second feed branch only in a direction toward said submarine cable branching unit when said first relay is set to be activated by said first current that flows in said first direction of said first current, said second relay being set to be activated in response to a second current flowing through said second feed branch only in a direction away from said submarine cable branching unit when said first relay is set to be activated by said first current flowing in said second direction of said first current;

a third relay provided in said second feed branch in series to said second relay, said third relay being set to be activated in response to a third current flowing through said second feed branch only in a direction away from said submarine cable branching unit when said second relay is set to be activated by said second current that flows toward said submarine cable branching unit, said third relay being set to be activated in response to a third current flowing through said second feed branch only in a direction toward said submarine cable branching unit when said second relay is set to be activated by said second current flowing away form said submarine cable branching unit;

said second feed branch including a first normally closed switch that is opened by said first relay, said first normally closed switch opening a ground path of said second feed branch in a normally closed state thereof;

said third feed branch including a second normally closed switch that is opened by said second relay, said second normally closed switch opening a ground path of said third feed branch in a normally closed state thereof;

said first feed branch including a third normally closed switch that is opened by said third relay, said third normally closed switch opening a ground path of said first feed branch in a normally closed state thereof;

said ground path of said second feed branch including: a fourth relay having a first normally open switch connected in series to said fourth relay, such that said fourth relay urges, when energized, said first normally open switch to close.

7. A power feed circuit for use in a submarine cable branching unit for branching submarine cables, comprising:

a first cable having a first end connected to said submarine cable branching unit and a second, opposite end adapted for connection to a first land station, said first cable including a first feed branch for feeding electric power from said first land station to said submarine cable branching unit;

a second cable having a first end connected to said submarine cable branching unit and a second, opposite end adapted for connection to a second land station, said second cable including a second feed branch for feeding electric power from said second land station to said submarine cable branching unit;

a third cable having a first end connected to said submarine cable branching unit and a second, opposite end adapted for connection to a third land station, said third cable including a third feed branch for feeding electric power from said third land station to said submarine cable branching unit;

said first through third feed branches being connected with each other at a common node in said submarine cable branching unit;

a first relay provided in said first feed branch, said first relay being activated in response to a first current flowing through said first feed branch only in one of a first direction toward said submarine cable branching unit and a second direction away from said submarine cable branching unit;

a second relay provided in said second feed branch, said second relay being set to be activated in response to a second current flowing through said second feed branch only in a direction toward said submarine cable branching unit when said first relay is set to be activated by said first current that flows in said first direction of said first current, said second relay being set to be activated in response to a second current flowing through said second feed branch only in a direction away from said submarine cable branching unit when said first relay is set to be activated by said first current flowing in said second direction of said first current;

a third relay provided in said third feed branch, said third relay being set to be activated in response to a third current flowing through said third feed branch only in a direction toward said submarine cable branching unit when said first relay is set to be activated by said first current that flows in said first direction of said first current, said third relay being set to be activated in response to a third current flowing through said third feed branch only in a direction away from said submarine cable branching unit when said first relay is set to be activated by said first current flowing in said second direction of said first current;

said second feed branch including a first normally closed switch that is opened by said first relay, said first normally closed switch opening a ground path of said second feed branch in a normally closed state thereof;

said third feed branch including a second normally closed switch that is opened by said second relay, said second normally closed switch opening a ground path of said third feed branch in a normally closed state thereof;

said first feed branch including a third normally closed switch that is opened by said third relay, said third normally closed switch opening a ground path of said first feed branch in a normally closed state thereof;

said ground path of said second feed branch including a fourth relay and a self-sustaining switch connected in series to said fourth relay, such that said fourth relay urges, when energized, said self-sustaining switch to close;

said first feed branch further including a bypassing switch so as to bypass said third normally closed switch therein, said bypassing switch being closed in response to energization of said fourth relay.

8. A power feed circuit as claimed in claim 7, wherein said bypassing switch is a normally opened switch that closes to form a bypass of said third normally closed switch upon energization of said fourth relay.

9. A power feed circuit as claimed in claim 7, wherein said ground path of said second feed branch further includes a fifth relay such that said fifth relay is energized simultaneously to said fourth relay; and wherein said bypassing switch is urged to form a bypass of said third normally closed switch in response to energization of said fifth relay.

10. A power feed circuit as claimed in claim 9, wherein said fifth relay is provided in series to said fourth relay.

11. A power feed circuit as claimed in claim 9, wherein said fifth relay is provided in parallel to said fourth relay.

12. A power feed circuit for use in a submarine cable branching unit for branching submarine cables, comprising:

a first cable having a first end connected to said submarine cable branching unit and a second, opposite end adapted for connection to a first land station, said first cable including a first feed branch for feeding electric power from said first land station to said submarine cable branching unit;

a second cable having a first end connected to said submarine cable branching unit and a second, opposite end adapted for connection to a second land station, said second cable including a second feed branch for feeding electric power from said second land station to said submarine cable branching unit;

a third cable having a first end connected to said submarine cable branching unit and a second, opposite end adapted for connection to a third land station, said third cable including a third feed branch for feeding electric power from said third land station to said submarine cable branching unit;

said first through third feed branches being connected with each other at a common node in said submarine cable branching unit;

a first relay provided in said first feed branch, said first relay being activated in response to a first current flowing through said first feed branch only in one of a first direction toward said submarine cable branching unit and a second direction away from said submarine cable branching unit;

a second relay provided in said second feed branch, said second relay being set to be activated in response to a second current flowing through said second feed branch only in a direction toward said submarine cable branching unit when said first relay is set to be activated by said first current that flows in said first direction of said first current, said second relay being set to be activated in response to a second current flowing through said second feed branch only in a direction away from said submarine cable branching unit when said first relay is set to be activated by said first current flowing in said second direction of said first current;

a third relay provided in said second feed branch in series to said second relay, said third relay being set to be activated in response to a third current flowing through said second feed branch only in a direction away from said submarine cable branching unit when said second relay is set to be activated by said second current that flows toward said submarine cable branching unit, said third relay being set to be activated in response to a third current flowing through said second feed branch only in a direction toward said submarine cable branching unit when said second relay is set to be activated by said second current flowing away form said submarine cable branching unit;

said second feed branch including a first normally closed switch that is opened by said first relay, said first normally closed switch opening a ground path of said second feed branch in a normally closed state thereof;

said third feed branch including a second normally closed switch that is opened by said second relay, said second normally closed switch opening a ground path of said third feed branch in a normally closed state thereof;

said first feed branch including a third normally closed switch that is opened by said third relay, said third normally closed switch opening a ground path of said first feed branch in a normally closed state thereof;

said ground path of said second feed branch including: a fourth relay having a first normally open switch connected in series to said fourth relay, such that said fourth relay urges, when energized, said first normally open switch to close.

* * * * *